US00RE45296E

(19) United States
(12) Reissued Patent
Kyu

(10) Patent Number: US RE45,296 E
(45) Date of Reissued Patent: Dec. 23, 2014

(54) FRAME FOR A BICYCLE

(75) Inventor: Song Joon Kyu, Kyungki-Do (KR)

(73) Assignee: Mando Corporation, Gyeonggi-Do (KR)

(21) Appl. No.: 29/412,583

(22) Filed: Feb. 6, 2012

Related U.S. Patent Documents

Reissue of:
(64) Patent No.: Des. 643,785
Issued: Aug. 23, 2011
Appl. No.: 29/379,863
Filed: Nov. 24, 2010

(30) Foreign Application Priority Data

May 26, 2010 (KR) ..... 30-2010-0023267

(51) LOC (10) Cl. ..... 12-11
(52) U.S. Cl.
USPC ..... D12/111
(58) Field of Classification Search
USPC ..... D12/111, 117, 119; 280/274–280, 280/281.1, 283–288, 288.1–288.4
See application file for complete search history.

(56) References Cited

U.S. PATENT DOCUMENTS

| | | | | |
|---|---|---|---|---|
| 6,032,971 | A * | 3/2000 | Herder | 280/278 |
| 6,267,401 | B1 * | 7/2001 | De Jong | 280/287 |
| 6,688,625 | B1 * | 2/2004 | Schreuder et al. | 280/260 |
| D487,234 | S * | 3/2004 | Chen et al. | D12/111 |
| 6,764,090 | B1 * | 7/2004 | Pan | 280/278 |
| D494,508 | S * | 8/2004 | Liu | D12/111 |
| D497,574 | S * | 10/2004 | Yamabe | D12/111 |
| D547,702 | S * | 7/2007 | Tabuchi et al. | D12/111 |

* cited by examiner

*Primary Examiner* — Philip S Hyder
(74) *Attorney, Agent, or Firm* — McDermott Will & Emery LLP

(57) CLAIM

The ornamental design for a frame for a bicycle, as shown and described.

DESCRIPTION

FIG. 1 is a front/right-side/top perspective view of a frame for a bicycle showing the new design;
FIG. 2 is a front-side elevational view thereof;
FIG. 3 is a rear-side elevational view thereof;
FIG. 4 is a left-side elevational view thereof;
FIG. 5 is a right-side elevational view thereof;
FIG. 6 is a top-side elevational view thereof; and
FIG. 7 is a bottom-side elevational view thereof.
FIG. 8 is a front/right-side/top perspective view of the frame for a bicycle in a folded configuration;
FIG. 9 is a front-side elevational view thereof;
FIG. 10 is a rear-side elevational view thereof:
FIG. 11 is a left-side elevational view thereof;
FIG. 12 is a right-side elevational view thereof;
FIG. 13 is a top-side elevational view thereof;
FIG. 14 is a bottom-side elevational view thereof; and,
FIG. 15 illustrates is a front/right-side/top perspective view of the claimed frame for a bicycle, with environmental structure illustrated in broken lines that forms no part of the claimed design.

1 Claim, 15 Drawing Sheets

Figure 1:
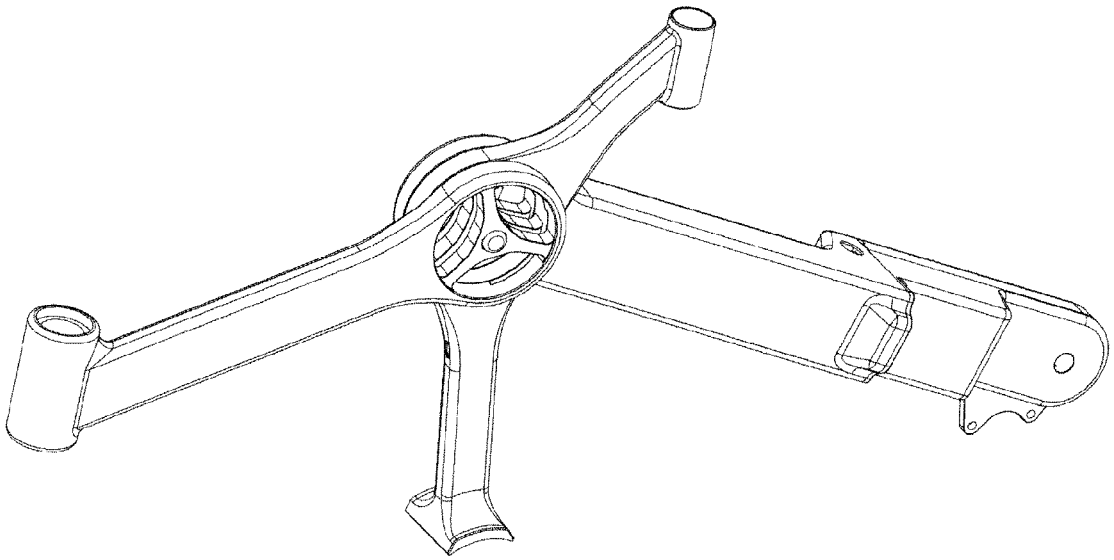
Figure 2:
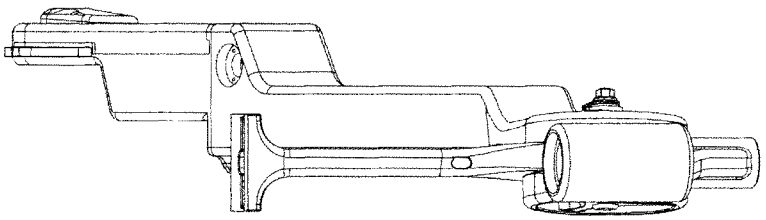
Figure 3:
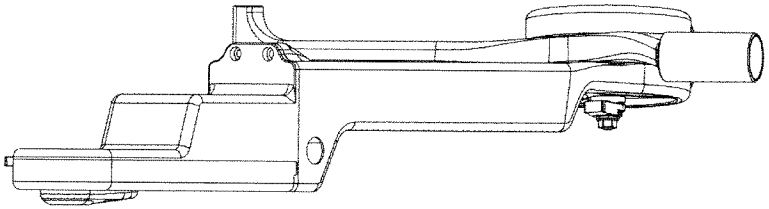
Figure 4:
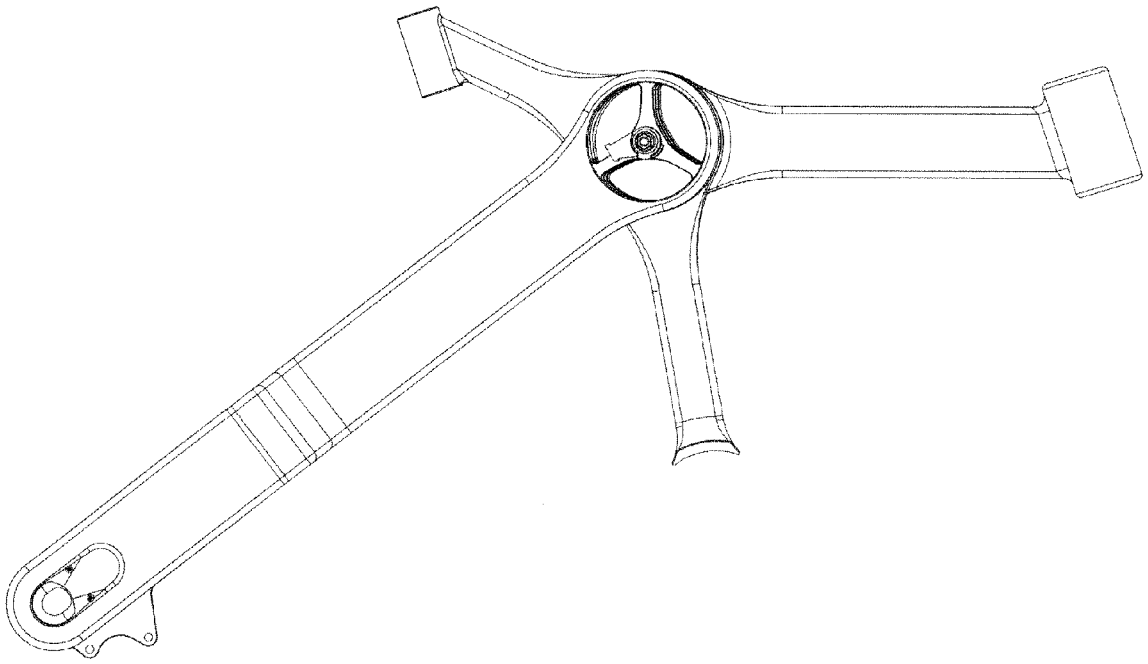
Figure 5:
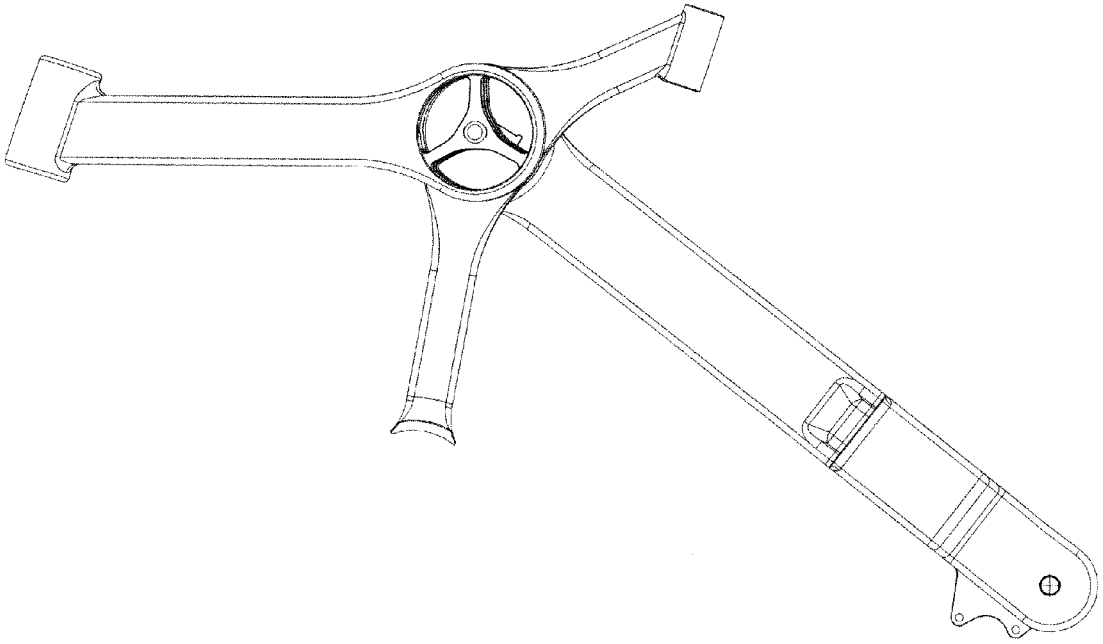
Figure 6:
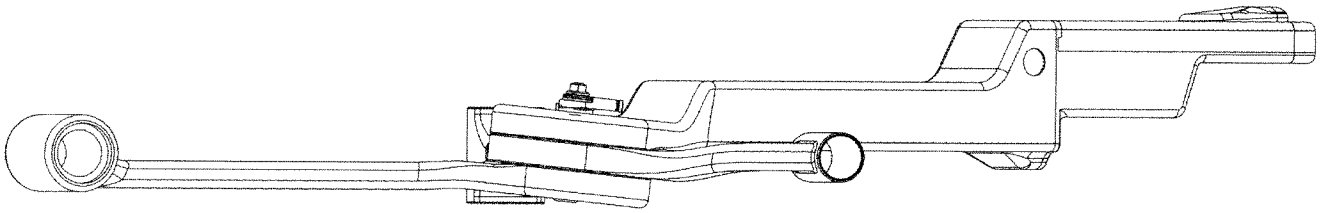
Figure 7:
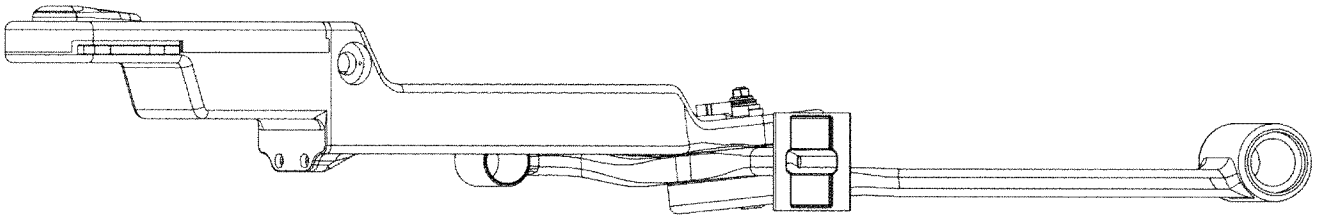
Figure 8:
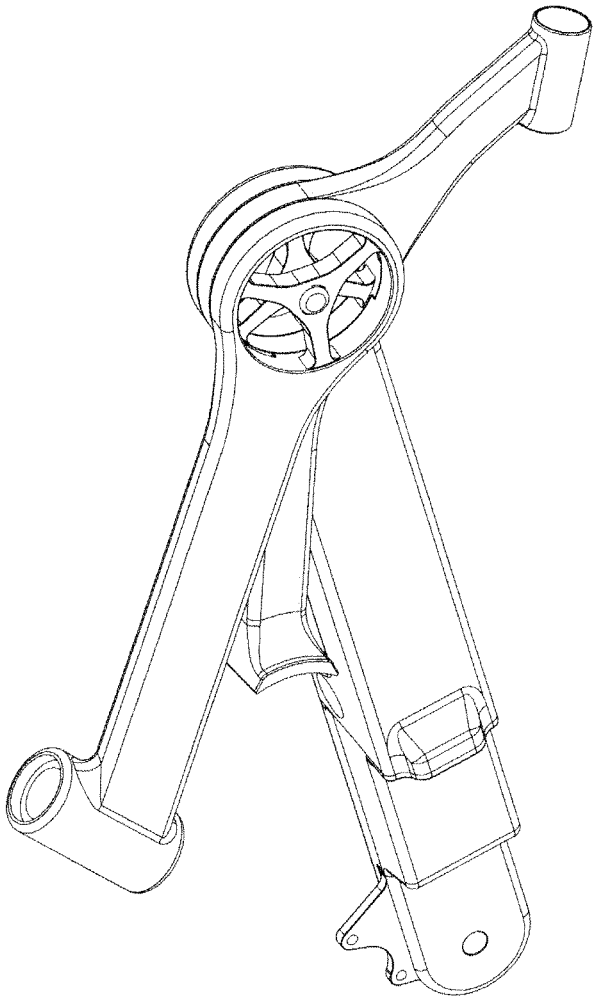
Figure 9:
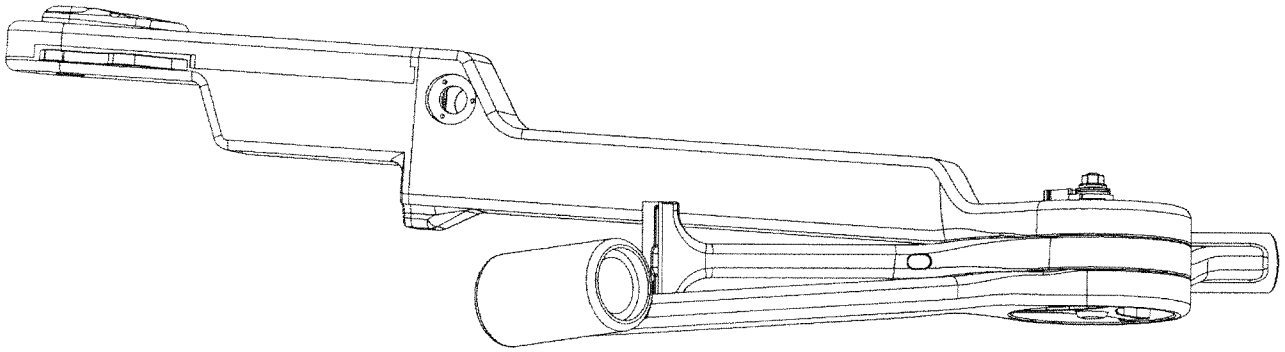
Figure 10:
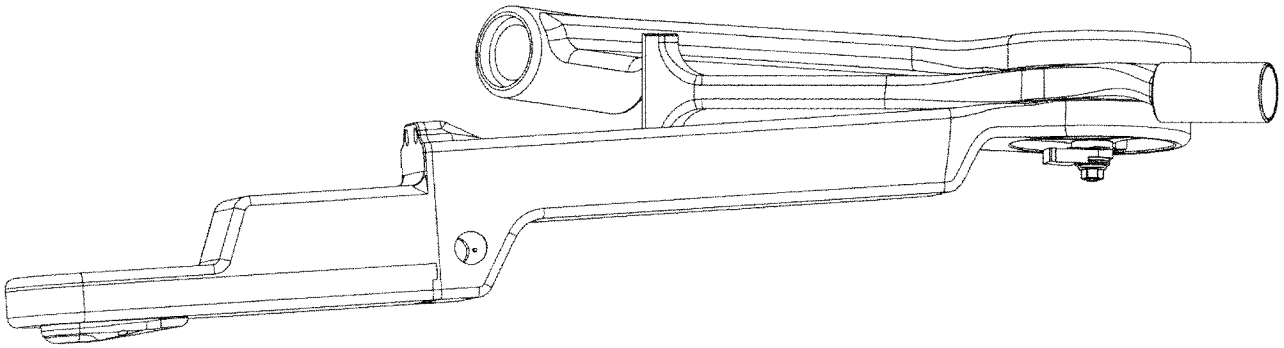
Figure 11:
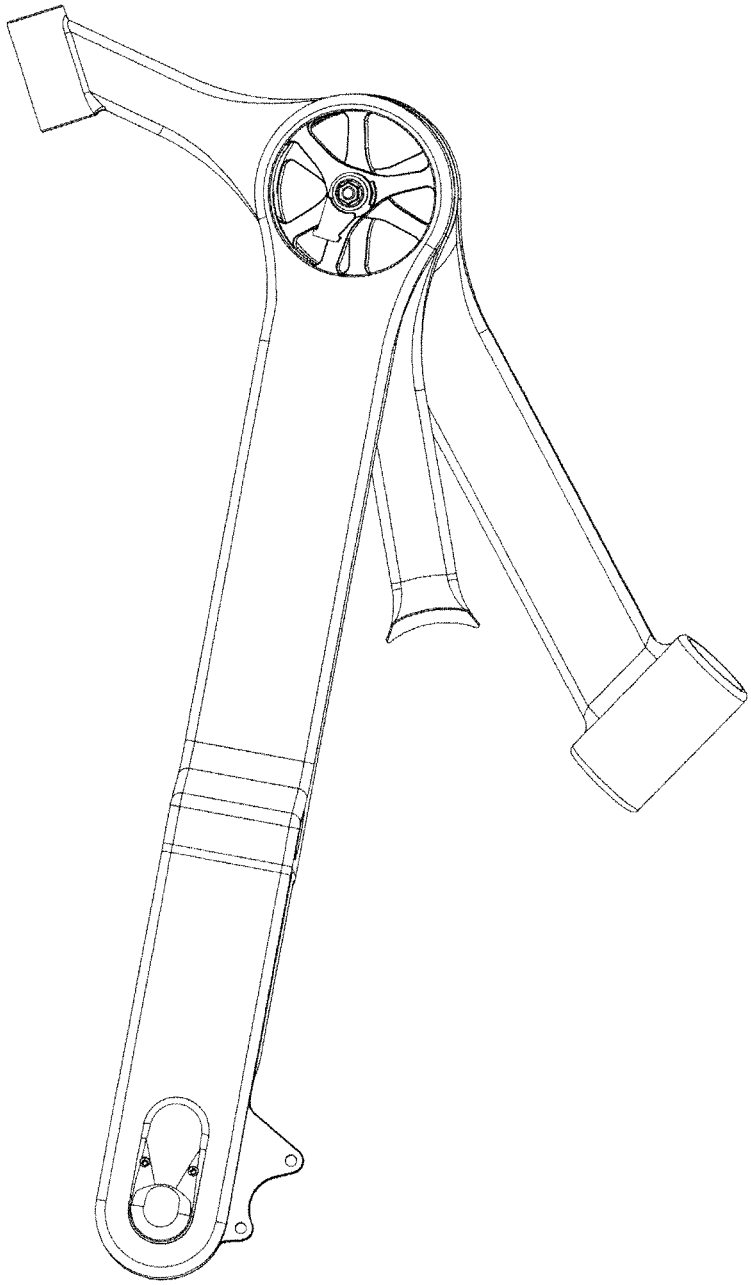
Figure 12:
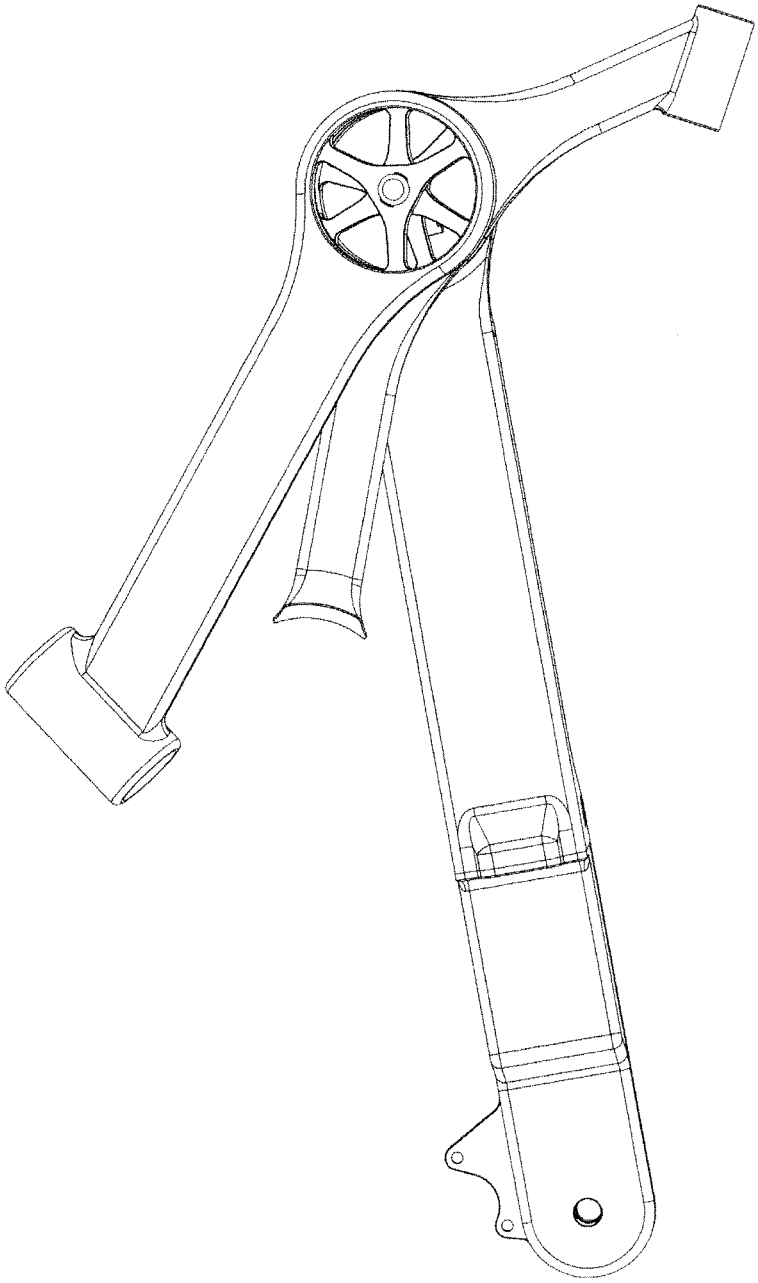
Figure 13:
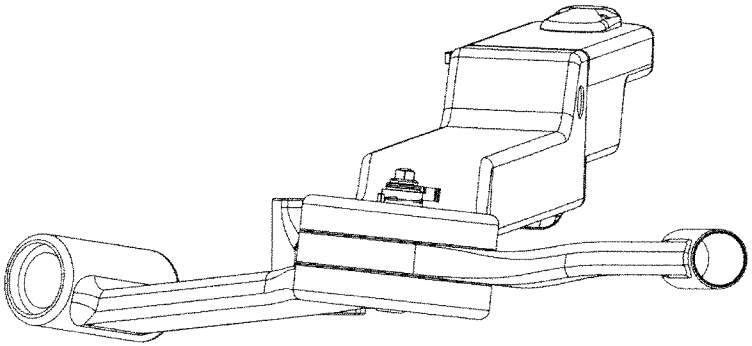
Figure 14:
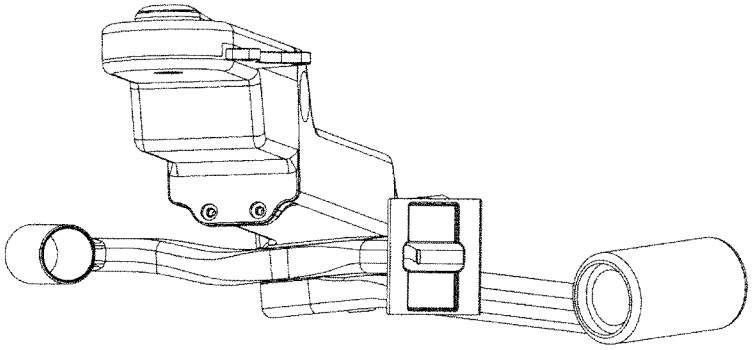
Figure 15:
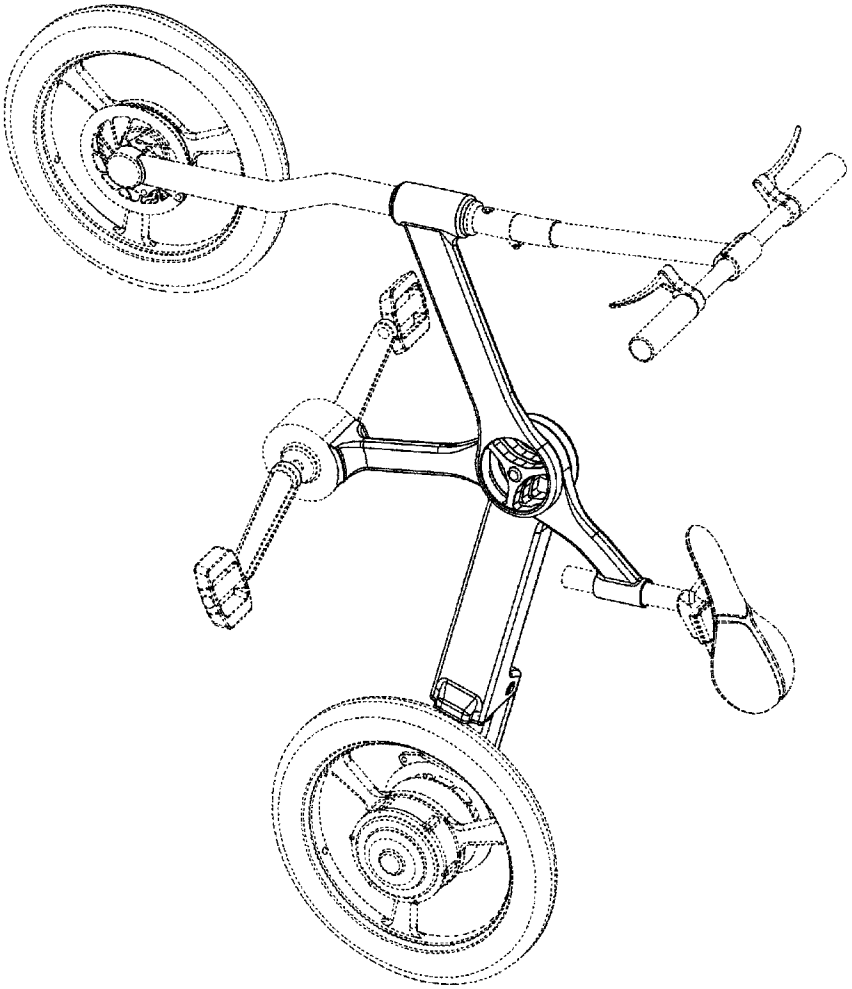

Matter enclosed in heavy brackets [ ] appears in the original patent but forms no part of this reissue; matter printed in italics indicates the additions made by reissue.